United States Patent
Zheng et al.

(10) Patent No.: US 9,771,155 B2
(45) Date of Patent: Sep. 26, 2017

(54) SEAT PAN FOR A PASSENGER SEAT AND PASSENGER SEAT

(71) Applicants: SINGAPORE TECHNOLOGIES AEROSPACE LTD, Paya Lebar (SG); TENRYU AERO COMPONENT CO., LTD., Kakamigahara, Gifu (JP)

(72) Inventors: Guo Ying Zheng, Paya Lebar (SG); Charles Fakhri Baz, Paya Lebar (SG); Teruo Sawada, Kakamigahara (JP)

(73) Assignees: Singapore Technologies Aerospace Ltd, Paya Lebar (SG); Tenryu Aero Component Co., Ltd., Kakamigahara, Gifu (JP)

( * ) Notice: Subject to any disclaimer, the term of this patent is extended or adjusted under 35 U.S.C. 154(b) by 0 days.

(21) Appl. No.: 14/782,296

(22) PCT Filed: Apr. 5, 2013

(86) PCT No.: PCT/SG2013/000139
§ 371 (c)(1),
(2) Date: Oct. 2, 2015

(87) PCT Pub. No.: WO2014/163582
PCT Pub. Date: Oct. 9, 2014

(65) Prior Publication Data
US 2016/0023765 A1 Jan. 28, 2016

(51) Int. Cl.
*B60N 2/12* (2006.01)
*B60N 2/42* (2006.01)
(Continued)

(52) U.S. Cl.
CPC ............ *B64D 11/064* (2014.12); *B60N 2/686* (2013.01); *B64D 11/0619* (2014.12); *B64D 11/0647* (2014.12)

(58) Field of Classification Search
CPC ............ B64D 11/0619; B64D 11/0647; B64D 11/064; B60N 2/686
(Continued)

(56) References Cited

U.S. PATENT DOCUMENTS 4,025,114 A * 5/1977 Cave ........................ A47C 7/20
297/452.55
5,133,587 A * 7/1992 Hadden, Jr. .......... B60N 2/4214
297/318 X (Continued)

FOREIGN PATENT DOCUMENTS

CN 202714515 U 2/2013
EP 1 393 655 A1 3/2004
(Continued)

OTHER PUBLICATIONS

International Search Report for corresponding International Application No. PCT/SG2013/000139, dated Oct. 31, 2013, 5pp.
(Continued)

*Primary Examiner* — Rodney B White
(74) *Attorney, Agent, or Firm* — Lewis Roca Rothgerber Christie LLP

(57) ABSTRACT

A seat pan for a passenger seat and a passenger seat. The seat pan is corrugated for partially absorbing a downward loading applied to the seat pan through deformation of a corrugation pattern of the seat pan as a result of a counter force applied by a support structure of the passenger seat.

20 Claims, 6 Drawing Sheets

(51) Int. Cl.
    *B64D 11/06*     (2006.01)
    *B60N 2/68*     (2006.01)

(58) Field of Classification Search
    USPC .......... 297/216.1–216.2, 316, 317, 318, 322, 297/337, 340, 341, 342, 452.55, 452.57
    See application file for complete search history.

(56) References Cited

U.S. PATENT DOCUMENTS

| | | | | |
|---|---|---|---|---|
| 5,836,654 | A * | 11/1998 | DeBellis | A47C 7/022 297/452.55 X |
| 6,010,195 | A * | 1/2000 | Masters | B60N 2/0232 297/452.55 X |
| 6,106,071 | A * | 8/2000 | Aebischer | B60N 2/2251 297/452.55 X |
| 6,168,239 | B1 * | 1/2001 | Conner | A47C 3/12 297/452.55 X |
| 6,409,269 | B1 * | 6/2002 | Aebischer | A47C 7/185 297/452.55 |
| 6,494,536 | B2 * | 12/2002 | Plant | A47C 1/0352 297/284.11 |
| 6,742,840 | B2 * | 6/2004 | Bentley | B60N 2/22 297/316 |
| 7,108,326 | B2 * | 9/2006 | Schurg | B60N 2/0292 297/341 X |
| 7,806,476 | B2 * | 10/2010 | Forgatsch | B60N 2/62 297/452.55 X |
| 7,926,873 | B2 * | 4/2011 | Rombouts | B64D 11/0015 297/188.1 |
| 8,272,694 | B2 * | 9/2012 | Hawkins | B60N 2/181 297/341 X |
| 8,376,458 | B2 * | 2/2013 | Meister | B64D 11/06 297/318 |
| 8,439,435 | B2 * | 5/2013 | Gaither | B60N 2/242 297/341 X |
| 8,540,313 | B2 * | 9/2013 | Fujita | B60N 2/028 297/317 X |
| 8,616,631 | B2 * | 12/2013 | Westerink | B60N 2/24 297/188.08 |
| 8,714,647 | B2 * | 5/2014 | Westerink | B64D 11/064 297/354.11 |
| 8,733,840 | B2 * | 5/2014 | Westerink | B64D 11/06 297/341 X |
| 8,782,835 | B2 * | 7/2014 | Pozzi | B64D 11/0647 244/118.6 |
| 8,783,771 | B2 * | 7/2014 | Oleson | B64D 11/06 297/318 X |
| 2002/0190548 | A1 * | 12/2002 | Ruel | B60R 21/207 297/216.1 |
| 2003/0067200 | A1 | 4/2003 | Habermann et al. | |
| 2006/0181127 | A1 | 8/2006 | Pennington et al. | |
| 2008/0169694 | A1 * | 7/2008 | Speh | B60N 2/2209 297/300.1 |
| 2010/0187881 | A1 | 7/2010 | Fujita et al. | |
| 2010/0308167 | A1 | 12/2010 | Hawkins et al. | |
| 2011/0148175 | A1 | 6/2011 | Fujita et al. | |
| 2012/0248839 | A1 * | 10/2012 | Fujita | B60N 2/24 297/452.55 X |
| 2015/0210190 | A1 * | 7/2015 | Ruckriegel | B60N 2/72 297/216.13 |
| 2015/0239380 | A1 * | 8/2015 | Sugiyama | B60N 2/646 297/452.18 |
| 2015/0284087 | A1 * | 10/2015 | Henshaw | B64D 11/064 297/318 |

FOREIGN PATENT DOCUMENTS

| | | |
|---|---|---|
| EP | 1 908 374 A1 | 4/2008 |
| JP | 11-75984 A | 3/1999 |
| JP | 2000-132 A | 1/2000 |
| JP | 2009-493 A | 1/2009 |
| WO | WO 2009/142301 A1 | 11/2009 |
| WO | WO 2010/005678 A3 | 1/2010 |

OTHER PUBLICATIONS

Office action dated Sep. 27, 2016 in corresponding Japanese Patent Application No. 2016-506294 including English translation, 10pp.
Office action dated Feb. 27, 2017 for corresponding Chinese Application No. 201380077205.3, including Eng. translation 19pp.

* cited by examiner a)

b)

SEAT PAN FOR A PASSENGER SEAT AND PASSENGER SEAT

CROSS-REFERENCE TO RELATED APPLICATIONS

This application is a national phase application under 35 U.S.C. §371 of International Application No. PCT/SG2013/000139, filed on Apr. 5, 2013, the disclosure of which is incorporated herein by reference in its entirety.

FIELD OF INVENTION

The present invention relates broadly to a seat pan for a passenger seat and to a passenger seat.

BACKGROUND

A standard economy-class-type passenger seat for an aircraft comprises of a seat bottom, a reclining seat back and armrests, all supported by structural frames mounted on a laterally spaced-apart leg assembly.

One of the most common causes of injuries experienced in an aircraft crash is by excessive initial loads caused by deceleration, for which loads the materials of the aircraft's underlying support structures and their ability to dissipate energy are the main factors. For example, in a crash scenario, a 14 g downward load may be experienced.

Typically, the leg assembly design has taken into account the 14 g downward load crash scenario. A leg assembly that is too stiff may be able to prevent the seat from collapsing on itself during a crash, keeping the occupants safe from being crushed. However, that stiffness in turn may cause damage to the vital internal organs and spinal column of the passenger, as little energy is attenuated or absorbed during the incident. Conversely, if the leg assembly is too flexible, it would overly deform and fail in a crash.

Embodiments of the present invention seek to provide at least an alternative to existing approaches for addressing the 14 g downward load in a crash scenario.

SUMMARY

In accordance with a first aspect of the present invention, there is provided a seat pan for a passenger seat, the seat pan being corrugated for partially absorbing a downward loading applied to the seat pan through deformation of a corrugation pattern of the seat pan as a result of a counter force applied by a frame structure of the passenger seat.

In accordance with a second aspect of the present invention, there is provided a passenger seat comprising a seat pan according to the first aspect.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention relate to a top seat pan that can partially absorb a downward loading applied to the seat pan through deformation of a corrugation pattern of the seat pan as a result of a counter force applied by a frame structure of the passenger seat. In the described embodiments, a passenger can slide the seat pan forward while tilting the forward end of the seat pan slightly upwards and its rear end downwards, with or without simultaneous movement of the seat back assembly, in order to preferably meet various passengers' comfort needs.

Figure 1:
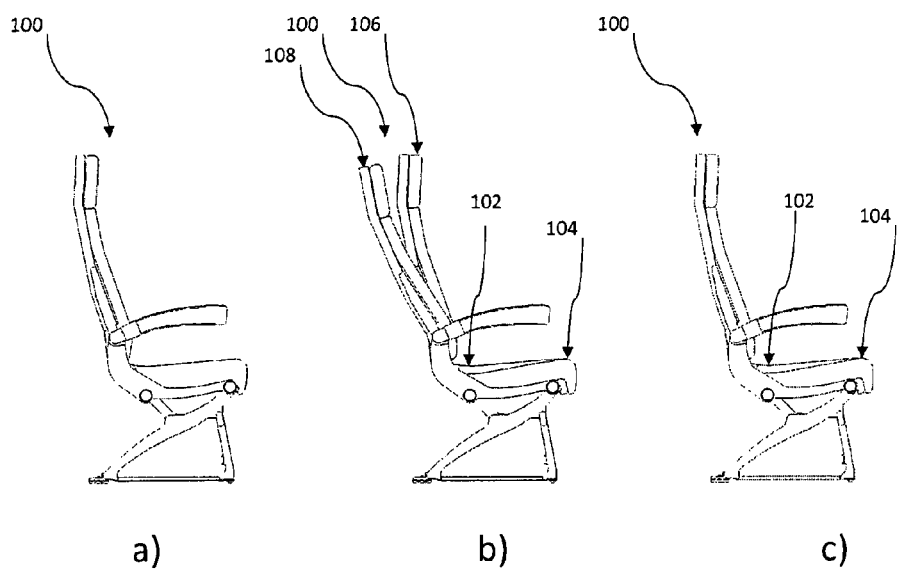
FIGS. 1a)-b) show schematic drawings illustrating simultaneous movement of the top seat pan and the seat back frame according to an example embodiment.
FIG. 1c) shows a schematic drawing illustrating independent movement of the top seat pan according to an example embodiment.

As illustrated in FIGS. 1a)-b), for simultaneous movement of the top seat pan (hidden), the seat back frame 100 is reclined according to one embodiment. The bottom of the seat back frame 100 pushes against the top seat pan in the forward direction, forcing the curved top seat pan to shift forward, tilt the forward end upwards and tilt the rear end downwards, as illustrated by the change in the seat cushion outline, indicated at numerals 102 and 104, corresponding to the seat back positions at numerals 106 and 108 respectively, in FIG. 1b).

Alternatively, as illustrated in FIG. 1c), by leaning and pushing against the upright seat frame 100 using e.g. one's hips with a predetermined amount of force, the top sliding pan shifts forward, the forward end tilts upwards and the rear end tilts downwards, as illustrated by the change in the seat cushion outline, indicated at numerals 102 and 104, but without movement of the seat back frame 100. In this embodiment, advantageously moving the top sliding pan, and thus the seat cushion, does not necessarily require the seat back frame 100 to recline, but can also be achieved if the seat back frame 100 is upright or is partially reclined.

In an example embodiment, the degree to which the passenger wishes to shift the seat depends on the amount of force applied. The rate at which the seat moves forward in relation to the rate at which the forward end of the top seat pan moves upward and the rear end of the top seat pan moves downward (and thus the seat cushion correspondingly) can be determined by the design of the seat structure including the top seat pan.

Figure 2:
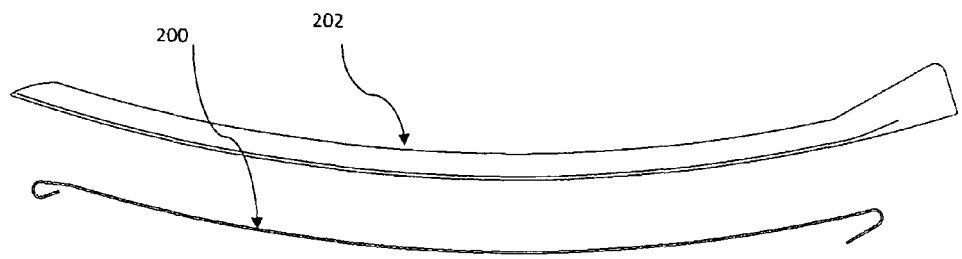
FIG. 2 shows a schematic side view drawing of top and bottom seat pans according to an example embodiment.

With reference to FIG. 2, the seat structure in an example embodiment comprises two ergonomically curved pans, a bottom pan 200 and a top sliding pan 202. Preferably, the profiles of both pans 200, 202 are similar or matched, and can be identically corresponding in a preferred embodiment. This can allow the top pan 200 to slide over the bottom pan 202 with minimal interference and can advantageously support the different seated postures of passengers, for example during long haul flights.

Figure 3:
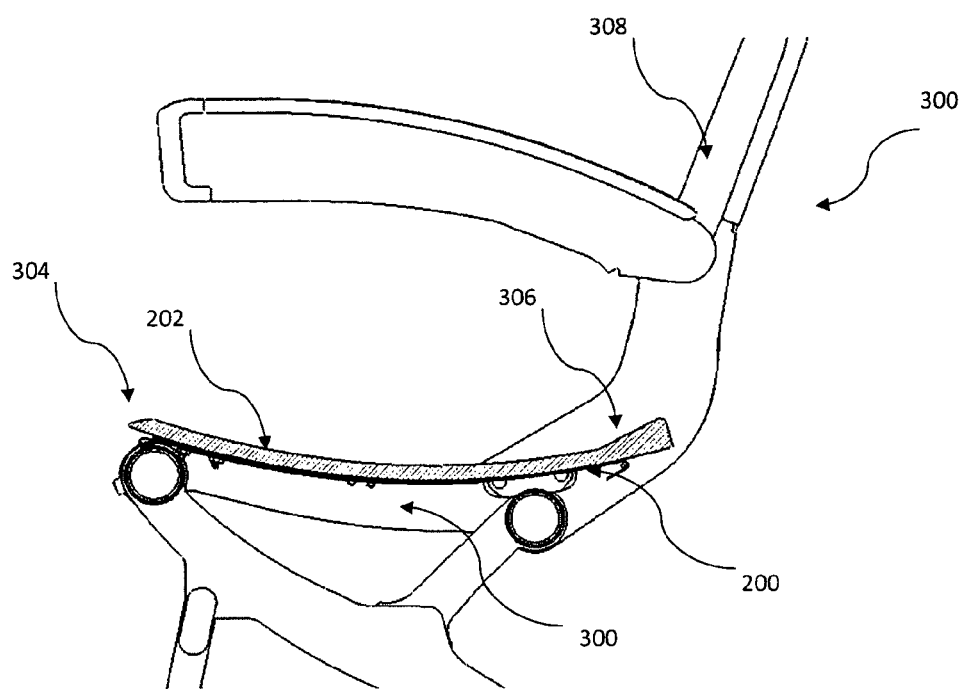
FIG. 3 shows a schematic side view drawings of part of a passenger seat comprising a seat pan according to an example embodiment.

With reference to FIG. 3, the bottom pan 200 is rigidly connected to the primary frame structure 300 of the seat 302 to advantageously form a shear resistant diaphragm so as to enhance the seat structure's 300 integrity. The bottom pan 200 can be fabricated for individual seats or can span the width of a multi-seat configuration, e.g. a triple seat configuration. The individual top pans 202 are supported by the bottom pan 200. The interface between the top pan 202 and the bottom pan 200 can include, but is not limited to, rollers and slide guides. The rollers can initiate the rolling motion and the sliders can provide a smooth sliding surface in example embodiments. The guiding of the top pan 202 by the bottom pan 200 can advantageously allow the top pan 202 to shift forward whilst raising the forward end 304 upwards and lowering the rear end 306 of the top seat pan 202 downwards, due to the curved profile in the example embodiment. The movement of the top seat pan 202 can be via an articulating seat back 308 or by active movement of the passenger body, such as slouching forward against an upright or partially reclined seat back 308. Advantageously, example embodiments can thus improve the comfort of the passenger by providing the passenger a wider selection of seating angles and postures. In a passenger seat incorporating the seat structure 300 of this example embodiment, a seat cushion (not shown) is mounted on the top seat pan 202, such that the seat cushion moves correspondingly to the movement of the top seat pan 202.

In this embodiment, the top seat pan 202 can advantageously partially absorb a downward loading applied to the top seat pan 202, through deformation of a corrugation pattern of the top seat pan 202 as a result of a counter force applied by the bottom pan 200, as a support structure of the passenger seat 302.

Figure 4:
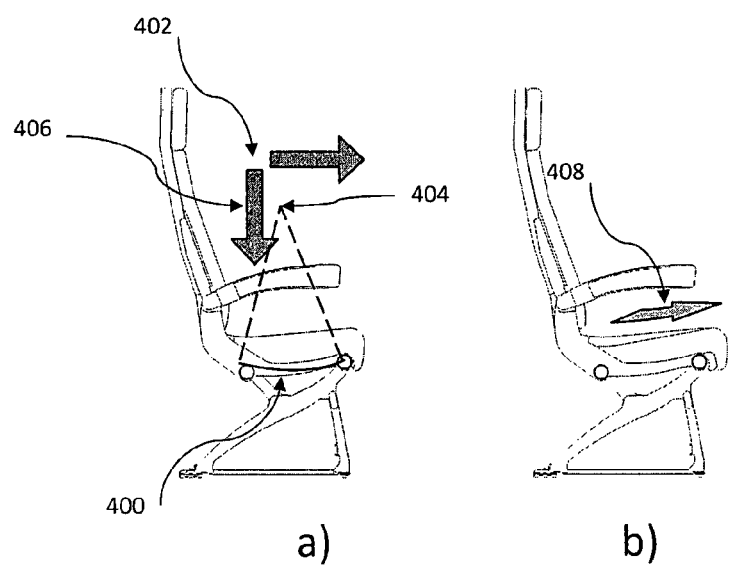
FIGS. 4a) and b) show schematic drawings illustrating movement of a seat pan according to an example embodiment.

Additionally, and with reference to FIGS. 4a) and b), the curvature 400 design of the top and bottom seat pans in an example embodiment can advantageously not only provide a comfortable seating experience, but can also provide energy attenuation during e.g. a hard landing or crash. When such an incident occurs, passengers can be subjected to vertical (downwards) and horizontal (forward) loads.

In an example embodiment, the curvature 400 is designed such that the centre of gravity, indicated at numeral 402, of most passengers in the seated position is rearward of the centre of curvature, indicated at numeral 404. Therefore, a downward load 406 can force the top seat pan 202 (FIG. 3) to slide forward, redirecting some of the energy away from compressing e.g. the passenger's spine. Preferably, some energy can be absorbed due to a biasing structure coupled to the top seat pan, such as one or more springs. Advantageously, the forward motion 405 of the top seat pan during such an emergency can also be beneficial in reducing a forward distance travelled by the passenger's head relative to the passenger's body during rapid deceleration.

Figure 5:
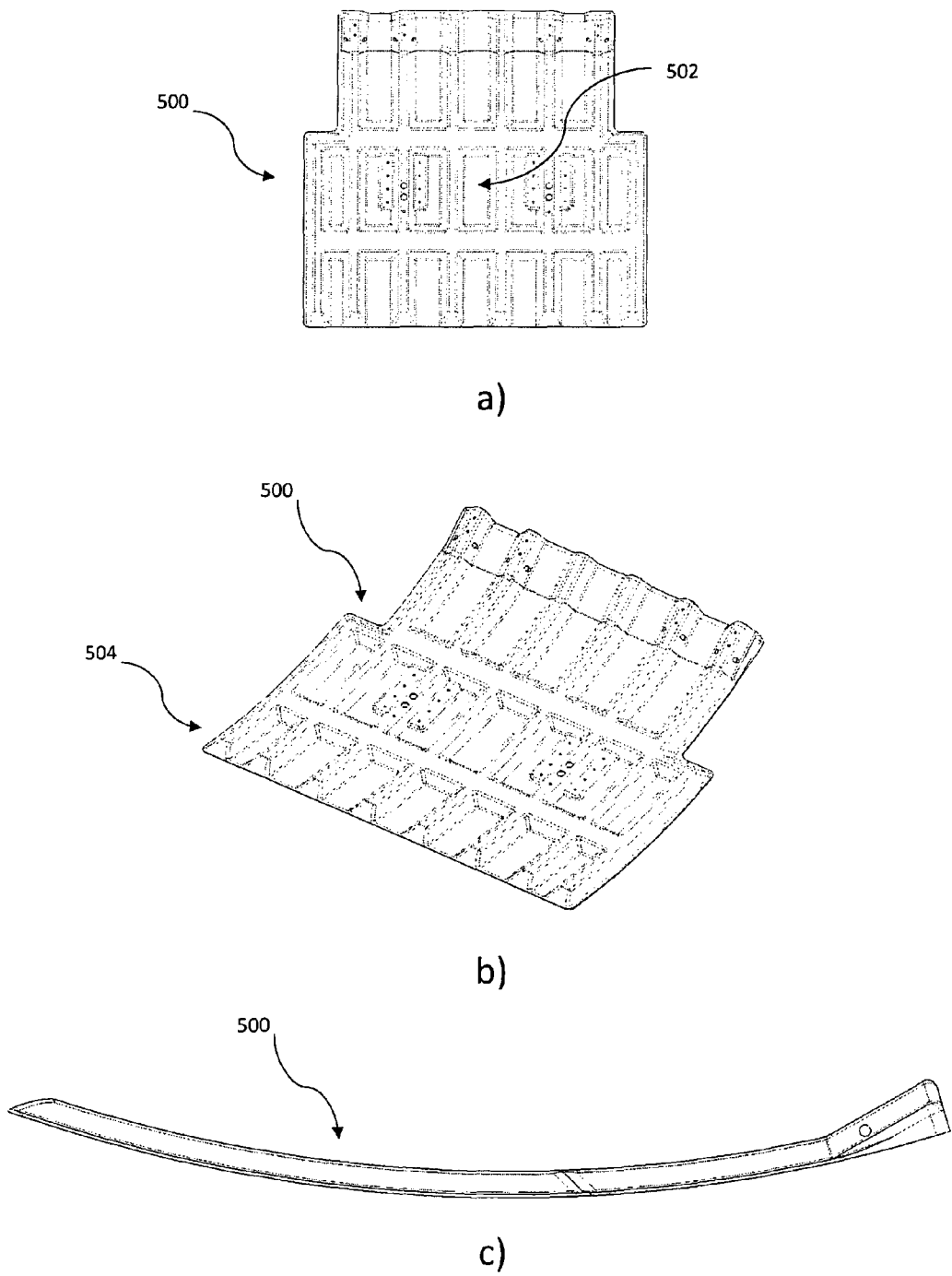
FIGS. 5a)-c) show schematic top, isometric top and side views respectively of a seat pan according to an example embodiment.

FIGS. 5a) to c) show schematic top, isometric and side views of a top seat pan 500 according to an example embodiment. In this example embodiment, the top seat pan's 500 cross-section is designed such as to advantageously provide a good contact surface with part of the seatback structure, e.g. a rod, and to allow the sub-components to be placed within the confines of the top seat pan's 500 rigid structure, hidden from plain sight with enough clearance for smooth operation. The top seat pan 500 can be made, for example, from metal, plastic or composite materials and when combined with the corrugated cross-section, the top seat pan 500 is advantageously able to absorb energy during emergency conditions such as 14 G downwards loading by e.g. deformation of the corrugated cross-section under compression, therefore preferably reducing the loads experienced by the passenger and enhancing survivability. The top seat pan 500 may be made from a transparent material such as a transparent plastic, which can advantageously aid in the inspection, assembly, as well as maintenance processes.

The nature of the corrugation of the top seat pan 500 can vary in different embodiments, for example the number, shape and dimensions of pockets e.g. 502 can be varied, to enhance the rigidity as well as the energy attenuation of the seat pan 500. In the example embodiment, the pockets e.g. 502 advantageously serve several purposes in the design of the seat pan 500:

1) Structural re-enforcements of the sheet 504 of material to provide/retain structural integrity.
2) Housing for sub-components of the seat structure 500
3) Absorption of energy during emergency conditions such as 14 G downwards loading.

Figure 6:
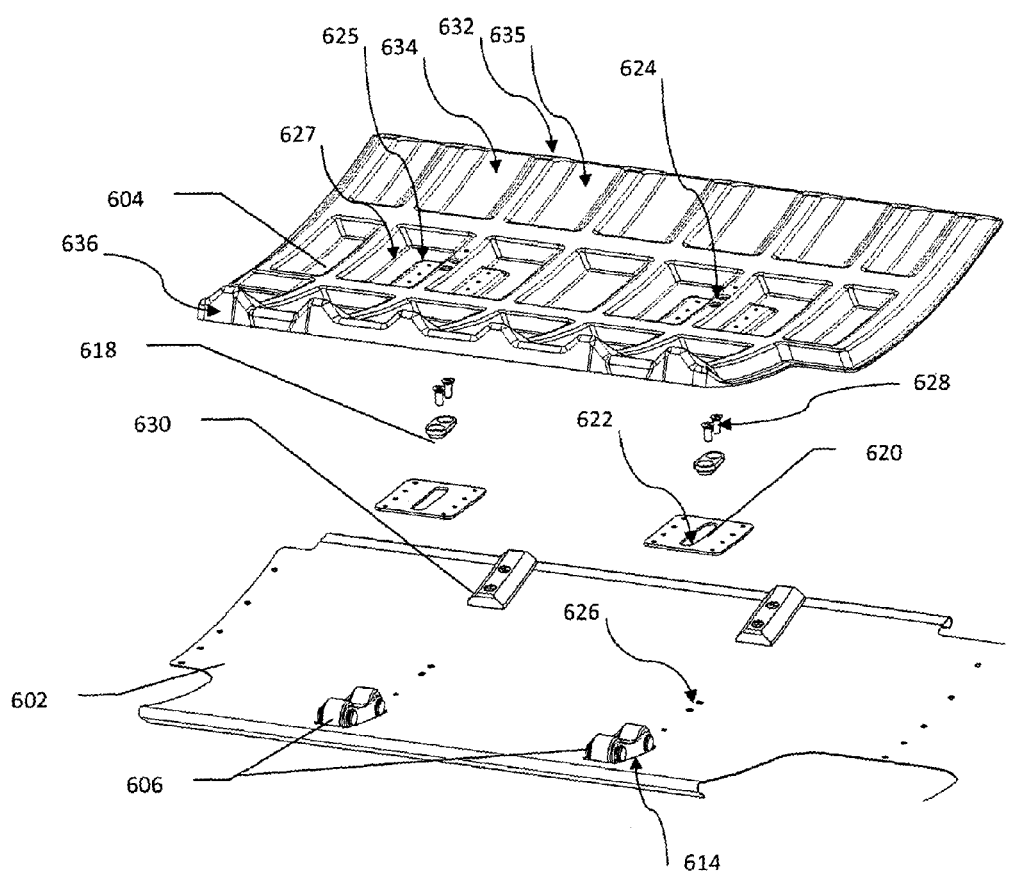
FIG. 6 shows a schematic exploded top view of components of a seat structure including a top seat pan according to an example embodiment.

With reference to FIG. 6, in one example embodiment the bottom pan 602 is fabricated to span the width of a multi-seat configuration, e.g. a triple seat configuration. Each top pan 604 is supported by the bottom pan 602. The interface between the top pan 604 and the bottom pan 602 includes rollers 606 supported in this embodiment by on one or more beams (not shown) connected to the seat frame (not shown). The rollers 606 are received in slots e.g. 614, which arrest the rollers 606 against lateral movement. Slider blocks e.g. 618 are provided for mounting on the bottom pan 602. Retainer frames e.g. 620 are configured such that each slider block e.g. 618 is received with a smaller end thereof extending through the slot e.g. 622 in each retainer frame e.g. 620, and with a top lip of the slider block e.g. 618 engaging the top rim of the slot e.g. 622. The retainer frames e.g. 620 are mounted to the top pan 604 using for example nuts and bolts with the slider blocks e.g. 618 received in the slots e.g. 622. Access holes e.g. 624 are provided in the top pan 604 for facilitating fastening of the slider blocks e.g. 618 on the bottom pan 602, during assembly, into fastening holes e.g. 626 formed in the bottom pan 602 for bolts e.g. 628 in this example embodiment. Recesses e.g. 625 are formed in some of the pockets e.g. 627 to receive the retainer frames e.g. 620.

Slide guides e.g. 630 are mounted on the bottom pan 602 and are received in tracks e.g. 632 formed on the top pan 604 extending between pockets e.g. 634, 635 of the corrugation pattern, for guiding movement of the top pan 604 relative to the bottom pan 602 when assembled.

In this embodiment, the top seat pan 604 can advantageously partially absorb a downward loading applied to the top seat pan 604, for example in a 14 g downward load scenario, through deformation of the corrugation pattern of the top seat pan 604 as a result of a counter force applied by the bottom pan 604, as a support structure of the passenger seat in this example embodiment.

In this embodiment, an interface 636 to the back seat structure for pushing the top pan 604 during reclining of the seat back extends across the corrugated cross section design of the top pan 604. The interface 636 advantageously receives the push force in such a way as to avoid bending at the interface 636, since the contact point/area is close to, or substantially at, a stiffness center of the top seat pan 604, to advantageously minimize a moment applied for improved durability and smoothness of movement. For example, in this embodiment the stiffness center would be located in the upper half of the interface 636.

The interface between seatback and top seat pan 604 can be designed in other ways in different embodiments, with the translation of the top seat pan 604 preferably being through contact, for achieving independent movement of the top pan 604. In different embodiments, for example varying contact areas, location, patterns etc. may be used.

The components and their installation as described for example embodiments preferably allow easy replacement during maintenance checks, and the design of the components is such that they can be fabricated with ease, as will be appreciated by a person skilled in the art. This advantageously means that while the components may experience wear and tear after prolonged usage, as with all moving components, they can be readily and cost effectively replaced during maintenance checks if required, and/or according to a replacement schedule.

Figure 7:
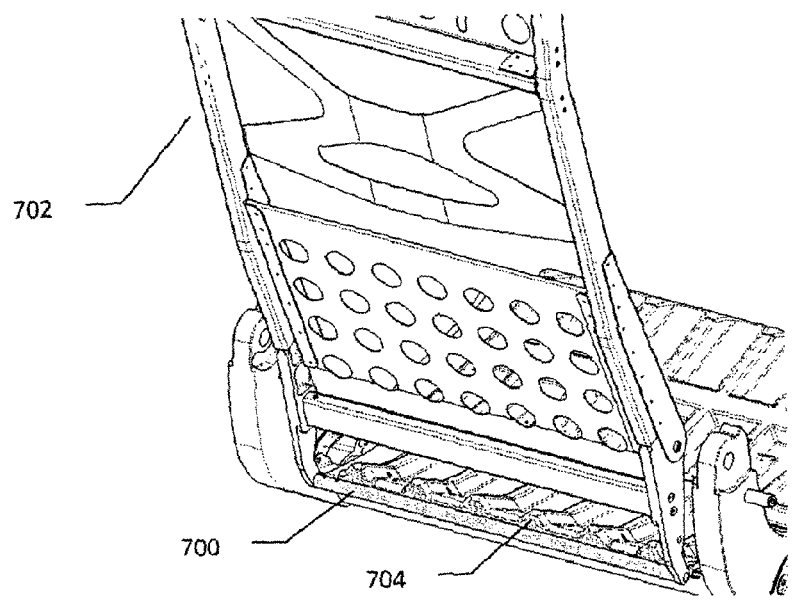
FIGS. 7a) and b) show a schematic isometric back view and a side view of part of a passenger seat comprising a seat structure including a top seat pan according to an example embodiment.
Figure 7:
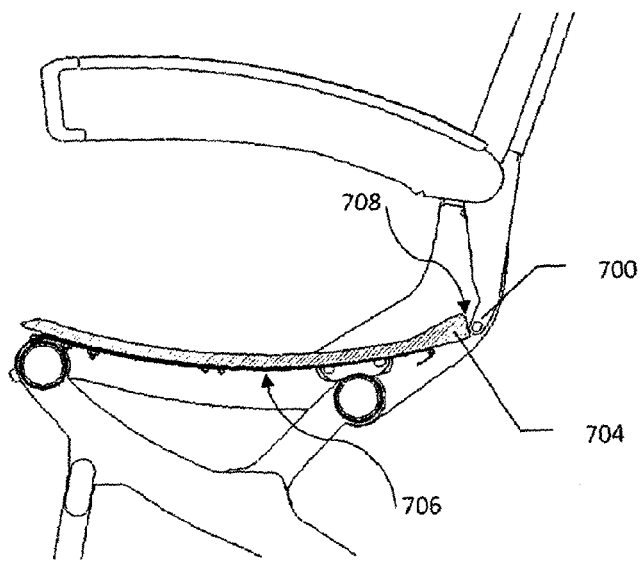

As shown in FIGS. 7a) and b), a rod 700 is provided in an example embodiment at the bottom of the back frame structure 702, which rod 700 is placed such that when the seatback reclines, the rod 702 advantageously pushes against the rear of the top seat pan 704. Thus, a force can be exerted by the seat back of the passenger seat for movement of the top seat pan 704 relative to the bottom seat pan 706. In this example embodiment, the top seat pan 704 comprises a substantially flat surface 708 disposed for receiving the force substantially perpendicularly to the surface 708. In an alternative embodiment, the rear surface may not be substantially flat, but may comprise a recess for receiving the rod 700 therein, providing a joint structure between the top pan and the back seat. In example embodiments, the interface between the top seat pan and the seat back is preferably designed such that the contact point/area is close to, or is substantially at, a stiffness center of the top seat pan, to minimize a moment applied for improving durability and smoothness of movement. As this coordinated movement is achieved by contact in this example embodiment, when the passenger retracts the seatback to the upright position, the top seat pan 704 will advantageously not necessarily follow unless the passenger relieves some weight off the top seat pan 704.

In an example embodiment, returning the top seat pan to the default position in preparation for TTOL (Taxiing, Take Off and Landing), can be facilitated by installing a biasing member such as a spring or springs, or spring structure(s) between the top, and bottom seat pans, or between the top seat pan and the seat frame. In the following, one non-limiting example will be described.

The top seat pan in the example embodiment can be moved by:
1) Reclining the seatback with the interface, e.g. a rod at bottom of the seatback, pushing the top seat pan whilst compressing the spring or springs. Forward movement of the top seat pan within the designed envelop can be controlled by the amount the seatback is reclined by.
2) Applying a force to the top seat pan. Forward movement of the top seat pan within the designed envelop can be controlled by the amount of force applied by e.g. the passenger to compress the spring or springs.
3) Spring expansion (relief). Rearward movement to the default position or to the point where the top seat pan is in contact with the seat back occurs when the force applied on the seat pan by e.g. the passenger is removed, allowing the spring or springs to expand from the compressed state and return to the acquiescent state or shape.

These mechanisms in an example embodiment advantageously allow independent movement of the top seat pan from the seatback when it is not reclined fully, as well as allowing automatic restoration of the seat pan when no force is acting on the top pan. The flexibility of selecting the seating position can preferably provide comfort to a large population passenger profile.

In addition to retracting the top seat pan back to its default position once e.g. the passenger's applied force is removed, the biasing means such as the spring or springs can advantageously also act as an energy absorption system during instances of rapid deceleration in the forward direction, such as the 16 g forward loading condition, via compression, which can enhance the survivability of the passenger. Furthermore, the energy absorbing springs can help reduce the forward distance travelled by the passenger's head in such an event. This is believed to be because preferably the head moves with the body against the spring or springs first, with the forward inertia being partially absorbed by the spring or springs. This can reduce the amount of travelling distance by the body and head as a whole, before the head may move further relative to the body due to any remaining energy.

Figure 8:
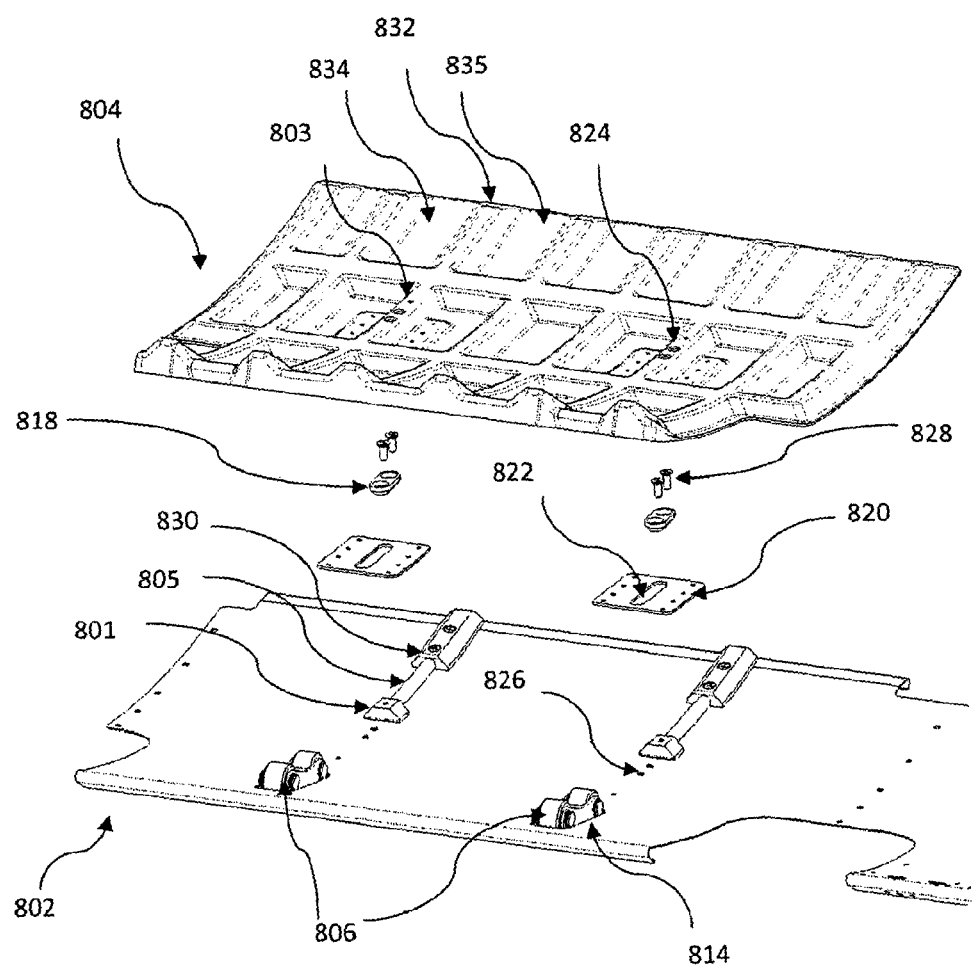
FIG. 8 shows a schematic exploded top view of components of a seat structure including a top seat pan according to an example embodiment.

With reference to FIG. 8, in one example embodiment, spring blocks e.g. 801 are attached to the underside of the top seat pan 804 using e.g. screws (not shown) through holes e.g. 803 in the top seat pan 804. The spring blocks e.g. 801 engage and compress springs e.g. 805 against the sliding movement of the top seat pan 804 relative to the bottom seat pan 802 while moving the top seat pan 804 forward. The springs e.g. 805 in turn store energy and can return the top seat pan 804 to its default position once the force on the seat pan 804 is relieved by e.g. the passenger.

The bottom pan 802 in this example is fabricated to span the width of a multi-seat configuration, e.g. a triple seat configuration. Each top pan 804 is supported by the bottom pan 802. It is noted that the top pan 804 is corrugated, for example like the top pan 504 described above with reference to FIG. 5, but the corrugation pattern has not been illustrated in FIG. 8 for ease of presentation. The interface between the top pan 804 and the bottom pan 802 includes rollers 806 supported by on one or more beams (not shown) connected to the seat frame (not shown). The rollers 806 are received in slots e.g. 814, which arrest the rollers 806 against lateral movement. Slider blocks e.g. 818 are provided for mounting on the bottom pan 802. Retainer frames e.g. 820 are configured such that each slider block e.g. 818 is received with a smaller end thereof extending through the slot e.g. 822 in each retainer frame e.g. 820, and with a top lip of the slider block e.g. 818 engaging the top rim of the slot e.g. 822. The retainer frames e.g. 820 are mounted to the top pan 804 using for example nuts and bolts with the slider blocks e.g. 818 received in the slots e.g. 822. Access holes e.g. 824 are provided in the top pan 804 for facilitating fastening of the slider blocks e.g. 818 on the bottom pan 802, during assembly, into fastening holes e.g. 826 formed in the bottom pan 802 for bolts e.g. 828 in this example embodiment. Slide guides e.g. 830 are mounted on the bottom pan 802 and are received in tracks (not shown) formed on the top pan 804 when assembled on top of the bottom pan 802, for guiding movement of the top pan 804 relative to the bottom pan 802.

With reference to FIG. 9, in one example embodiment the bottom pan 902 is fabricated to span the width of a multi-seat configuration, e.g. a triple seat configuration. Each top pan 904 is supported by the bottom pan 902. The interface between the top pan 904 and the bottom pan 902 includes rollers 906 supported by on one or more beams (not shown) connected to the seat frame (not shown). The rollers 806 are received in slots e.g. 814, which arrest the rollers 806 against lateral movement. Slider blocks e.g. 918 are provided for mounting on the bottom pan 902. Retainer frames e.g. 920 are configured such that each slider block e.g. 918 is received with a smaller end thereof extending through the slot e.g. 922 in each retainer frame e.g. 920, and with a top lip of the slider block e.g. 918 engaging the top rim of the slot e.g. 922. The retainer frames e.g. 920 are mounted to the top pan 904 using for example nuts and bolts with the slider blocks e.g. 918 received in the slots e.g. 922. Access holes e.g. 924 are provided in the top pan 904 for facilitating fastening of the slider blocks e.g. 918 on the bottom pan 902, during assembly, into fastening holes e.g. 926 formed in the bottom pan 902 for bolts e.g. 928 in this example embodiment. Recesses e.g. 925 are formed in some of the pockets e.g. 927 to receive the retainer frames e.g. 920.

Slide guides e.g. 930 are mounted on the bottom pan 902 and are received in tracks e.g. 932 formed on the top pan 904 extending between pockets e.g. 934, 935 of the corrugation pattern, for guiding movement of the top pan 904 relative to the bottom pan 902 when assembled.

In this embodiment, an interface 936 to the back seat structure for pushing the top pan 904 during reclining of the seat back extends across the corrugated cross section design of the top pan 904. The interface 936 advantageously receives the push force in such a way as to avoid bending at the interface 936, since the contact point/area is close to, or substantially at, a stiffness center of the top seat pan 904, to advantageously minimize a moment applied for improved durability and smoothness of movement. For example, in this embodiment the stiffness center would be located in the upper half of the interface 936.

The interface between seatback and top seat pan 904 can be designed in other ways in different embodiments, with the translation of the top seat pan 904 preferably being through contact, for achieving independent movement of the top pan 904. In different embodiments, for example varying contact areas, location, patterns etc. may be used.

In one embodiment, a seat pan for a passenger seat is provided, the seat pan being corrugated for partially absorbing a downward loading applied to the seat pan through deformation of a corrugation pattern of the seat pan as a result of a counter force applied by a support structure of the passenger seat. The seat pan can be corrugated along one or more directions thereof. The seat pan can gave a curvature configured to substantially match a curvature of the support structure. The curvature can be along a depth of the seat pan. The curvature can be between first and second opposing ends with an intermediate portion between the first and second ends, the intermediate portion being at a vertically lower position compared to the first and second ends, relative to the passenger seat.

In one embodiment, the seat pan is moveable relative to the support structure in forward and backward directions with reference to the frame structure. The seat pan can further be configured for receiving a force exerted by a seat back of the passenger seat for movement of the seat pan relative to the support structure. The seat pan can be configured to receive a pushing force exerted by the seat back. The seat pan can be configured to receive the pushing force as a result of reclining of the seat back.

In one embodiment, the seat pan can comprise an interface structure disposed for receiving the force. The interface structure can comprise a substantially flat surface for receiving the force. The interface structure can comprise a surface with a recess formed therein for receiving the force. The interface structure can be disposed at one end of the seat pan and can extend substantially across the corrugation pattern of the seat pan.

In one embodiment, the seat pan comprises one or more rollers for engaging one or more track strips mounted to the support structure.

In one embodiment, the seat pan comprises one or more track strips for engaging one or more rollers mounted to the support structure.

In one embodiment, the seat pan comprises one or more slider elements for being received in corresponding one or more guiding tracks mounted to the support structure.

In one embodiment, the seat pan comprises one or more guiding tracks for receiving one or more corresponding slider elements mounted to the support structure.

In one embodiment, the seat pan further comprises one or more retaining structures for limiting movement of the seat pan. Each restraining structure can comprise a first element on the seat pan for abutting a second element mounted to the support structure. The seat can further comprise biasing means for biasing the seat pan in a default position. The biasing means can comprise one or more springs.

In one embodiment, the support structure comprises a further seat pan of the passenger seat, and the seat pan is configured to be disposed above the further seat pan. The seat pan can be configured for being moveable relative to a frame structure of the passenger seat independent from movement of a seat back of the passenger seat.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, the retainer can be designed in other ways that sliding is allowed while sufficient holding strength has been provisioned through the design. Examples include varying locations, mechanical fastening methods. Preferably, the retainer design provides for securing the top seat pan in 16 g as well as 14 g situations.

As another example, the seat pans can be designed with different corrugation patterns, different shapes, different material as well as different processes to achieve desired moving patterns. Also, the biasing means can be provided differently, including using springs selected and installed with different stiffness, and/or at different locations to best suit an overall effect in accordance with the seat design in example embodiments.

The invention claimed is:

1. A passenger seat, comprising:
 a rigid top seat pan having a corrugation pattern; and
 a bottom seat pan;
 wherein the rigid top seat pan is disposed above the bottom seat pan for partially absorbing a downward loading applied to the rigid top seat pan through deformation of the corrugation pattern of the rigid top seat pan as a result of a counter force applied by the bottom seat pan.

2. The passenger seat as claimed in claim 1, wherein the rigid top seat pan is corrugated along one or more directions thereof.

3. The passenger seat as claimed in claim 1, wherein the rigid top seat pan has a curvature configured to substantially match a curvature of the bottom seat pan.

4. The passenger seat as claimed in claim 3, wherein the curvature is along a depth of the rigid top seat pan.

5. The passenger seat as claimed in claim 4, wherein the curvature is between first and second opposing ends with an intermediate portion between the first and second ends, the intermediate portion being at a vertically lower position compared to the first and second ends, relative to the passenger seat.

6. The passenger seat as claimed in claim 1, wherein the rigid top seat pan is moveable relative to the bottom seat pan in forward and backward directions with reference to the bottom seat pan.

7. The passenger seat as claimed in claim 1, wherein the top seat pan is further configured for receiving a force exerted by a seat back of the passenger seat for movement of the rigid top seat pan relative to the bottom seat pan.

8. The passenger seat as claimed in claim 7, wherein the rigid top seat pan is further configured to receive a pushing force exerted by the seat back.

9. The passenger seat as claimed in claim 8, wherein the rigid top seat pan is further configured to receive the pushing force as a result of reclining of the seat back.

10. The passenger seat as claimed in claim 7, wherein the rigid top seat pan comprises an interface structure disposed for receiving the pushing force.

11. The passenger seat as claimed in claim 10, wherein the interface structure comprises a substantially flat surface for receiving the pushing force.

12. The passenger seat as claimed in claim 10, wherein the interface structure comprises a surface with a recess formed therein for receiving the pushing force.

13. The passenger seat as claimed in claim 10, wherein the interface structure is disposed, at one end of the rigid top seat pan and extending substantially across the corrugation pattern of the rigid top seat pan.

14. The passenger seat as claimed in preceding claim 10, wherein the rigid top seat pan comprises one or more rollers for engaging one or more track strips mounted to the bottom seat pan.

15. The passenger seat as claimed claim 1, wherein the rigid top seat pan comprises one or more track strips for engaging one or more rollers mounted to the bottom seat pan.

16. The passenger seat as claimed in claim 1, wherein the rigid top seat pan comprises one or more slider elements for being received in corresponding one or more guiding tracks mounted to the bottom seat pan.

17. The passenger seat as claimed in claim 1, wherein the rigid top seat pan comprises one or more guiding tracks for receiving one or more corresponding slider elements mounted to the bottom seat pan.

18. The passenger seat as claimed in claim 1, further comprising one or more retaining structures for limiting movement of the rigid top seat pan, wherein each restraining structure comprises a first element on the rigid top seat pan for abutting a second element mounted to the bottom seat pan.

19. The passenger seat as claimed in claim 1, further comprising biasing means for biasing the rigid top seat pan in a default position, wherein the biasing means comprises one or more springs.

20. The passenger seat as claimed in claim 1, wherein the rigid top seat pan is configured for being moveable relative to a frame structure of the passenger seat independent from movement of a seat back of the passenger seat.

* * * * *